(12) United States Patent
Harwell

(10) Patent No.: US 6,655,897 B1
(45) Date of Patent: Dec. 2, 2003

(54) SYSTEMS AND METHODS FOR TRANSPORTING YOUNG FOWL FROM A HATCHERY TO A GROWOUT HOUSE

(76) Inventor: Chris Harwell, 4527 Oak St., Oakwood, GA (US) 30566-3368

( * ) Notice: Subject to any disclaimer, the term of this patent is extended or adjusted under 35 U.S.C. 154(b) by 130 days.

(21) Appl. No.: 09/978,323

(22) Filed: Oct. 16, 2001

(51) Int. Cl.[7] .................................................. B60P 3/04
(52) U.S. Cl. ........................ 414/498; 414/502; 414/528; 119/401; 119/845; 119/846; 198/435
(58) Field of Search ................................ 119/401, 845, 119/846, 453; 414/498, 502, 528; 198/435

(56) References Cited

U.S. PATENT DOCUMENTS

| | | | |
|---|---|---|---|
| 3,173,564 A | * | 3/1965 | Mayo ........................ 414/505 |
| 3,683,862 A | | 8/1972 | Reynolds |
| 3,702,600 A | | 11/1972 | Bright et al. |
| 3,704,688 A | * | 12/1972 | Wilson ........................ 119/439 |
| 3,871,335 A | | 3/1975 | Johnston et al. |
| 3,895,727 A | * | 7/1975 | Rucker ........................ 414/537 |
| 3,916,835 A | | 11/1975 | Reynolds |
| 3,921,588 A | | 11/1975 | Ledwell, Jr. |
| 3,942,476 A | | 3/1976 | Napier |
| 3,976,032 A | | 8/1976 | Ramser et al. |
| 4,084,714 A | | 4/1978 | Williams |
| 4,212,410 A | | 7/1980 | Galer |
| 4,301,769 A | | 11/1981 | Mola |
| 4,365,591 A | | 12/1982 | Wills et al. |
| 4,480,588 A | | 11/1984 | Holladay et al. |
| 4,499,856 A | | 2/1985 | Hecht et al. |
| 4,766,850 A | | 8/1988 | O'Neill |
| 5,060,596 A | | 10/1991 | Esbroeck |
| 5,470,194 A | | 11/1995 | Zegers |
| 5,699,755 A | | 12/1997 | Wills et al. |
| 5,902,089 A | | 5/1999 | Sinn et al. |
| 5,975,029 A | | 11/1999 | Morimoto et al. |
| 6,109,215 A | | 8/2000 | Jerome |
| 6,149,370 A | * | 11/2000 | DiBartolomeo ............. 414/498 |

FOREIGN PATENT DOCUMENTS

GB 2063183 * 6/1981

OTHER PUBLICATIONS

Anglia Autoflow, www.larking-gowen.co.uk/clients/c14.htm, description of automatic poultry handling device.

* cited by examiner

Primary Examiner—Steven A. Bratlie
(74) Attorney, Agent, or Firm—Kilpatrick Stockton LLP

(57) ABSTRACT

A portable device for transporting young fowl from a hatchery to a growout house within a climate-controlled compartment located on a delivery vehicle, wherein the portable device can be composed, in part, of a frame, at least one conveyor belt, at least one baffle coupled to each of the at least one conveyor belt, a plurality of rollers coupled to the frame to support the conveyor belts, a motor for driving the conveyor belts, and a plurality of wheels supporting the frame. In operation, young fowl are loaded onto the at least one conveyor belt at a hatchery using a loading slide. After the portable device has been loaded to a desired level, it is loaded into the climate-controlled compartment and transported to the growout house. The young fowl are unloaded by backing the delivery vehicle into the growout house and unloading the young fowl using an unloading slide.

57 Claims, 9 Drawing Sheets

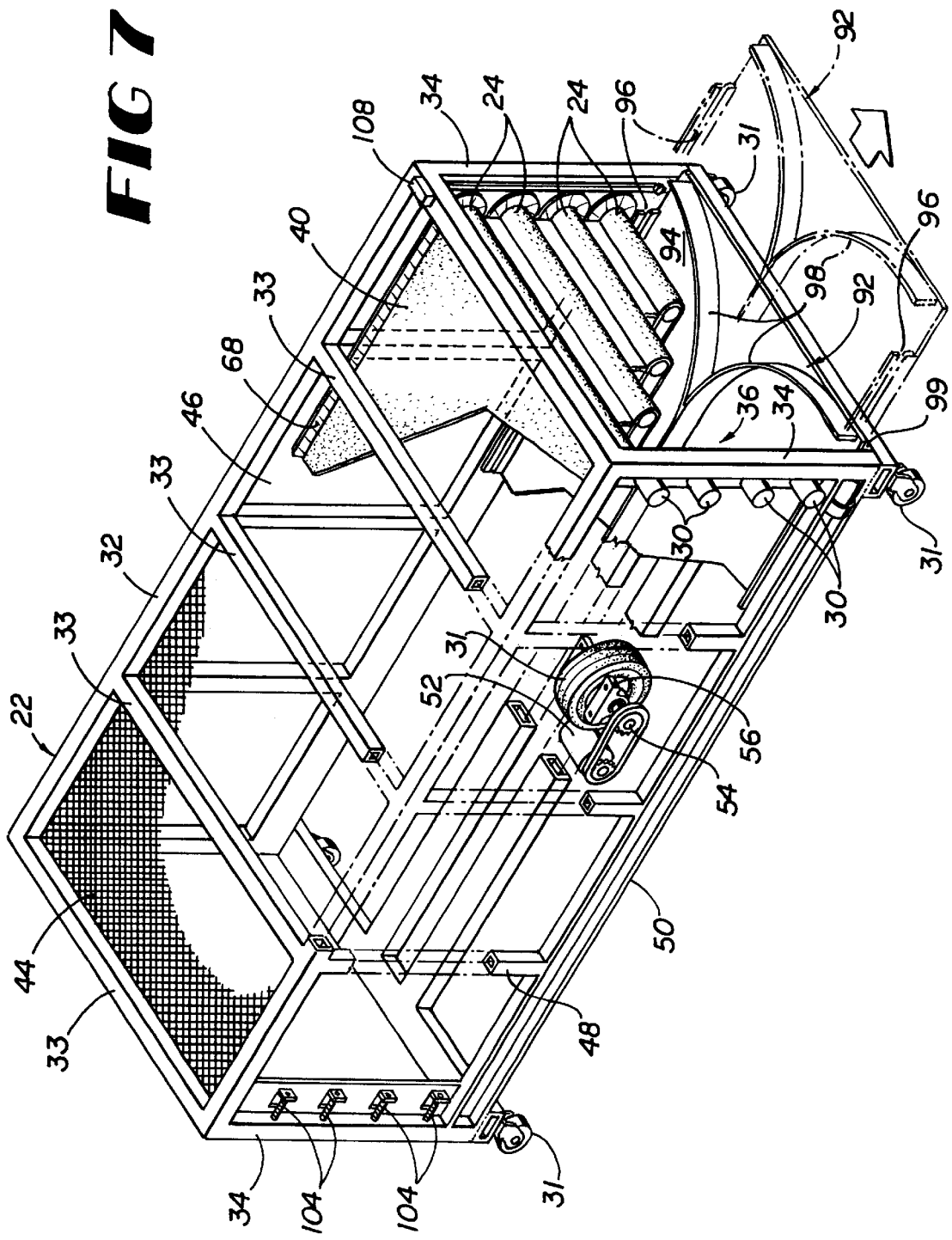

SYSTEMS AND METHODS FOR TRANSPORTING YOUNG FOWL FROM A HATCHERY TO A GROWOUT HOUSE

FIELD OF THE INVENTION

This invention relates to the commercial raising of fowl, and more particularly, to devices facilitating transportation of young chicks from a hatchery to a growout house.

BACKGROUND OF THE INVENTION

The poultry production industry has made numerous changes during recent history in the name of progress and efficiency. A single poultry farm no longer is the site of hatching chicks, raising chickens, and processing chickens. Instead, the poultry industry today is divided into highly specialized areas that bring hatchlings through their life cycle and on to the marketplace. Specifically, the industry is divided into hatcheries, growout houses that raise hatchlings from the time they are a few hours old until they are harvested, processing plants, distributors, and retailers.

The industry is divided into these highly specialized areas because of the competitive forces found within the industry. Generally speaking, a hatchery is responsible for incubating fertilized poultry eggs, hatching the eggs and caring for the chicks for a short time after hatching. Further, the hatchery is responsible for delivering a predetermined number of chicks to multiple growout houses. The hatchery begins the process of transporting the chicks to a growout house within hours of hatching.

This transportation process begins by moving the chicks from incubation areas to a conveyor system, where the chicks are moved through a counting system used by the hatchery to determine the number of chicks being shipped to a growout house. After the chicks pass through the counting system, the chicks are deposited into a collection tray, which is approximately 24 inches wide by 24 inches long by 4 inches high and is located beneath the end of the hatchery's conveyor system. The chicks fall from a height of about one foot into the collection tray. Once the collection tray is fully loaded with chicks, it is placed on a dolly. After a dolly has been fully loaded with containment trays, generally ten trays, the dolly is rolled into a vehicle in order to transport the chicks to a growout house. Typically, the vehicle used to transport the chicks to the growout house is a used school bus that has been converted to a chick transportation device by removing the passenger seats. Once the containment trays are in place on the vehicle, the dolly is removed and returned to the hatchery to get another load of containment trays. Typically, the containment trays are not secured while in the delivery vehicle; rather, the trays are simply stacked on the floor of the delivery vehicle. Each vehicle is capable of holding multiple stacks of containment trays for delivery to a growout house.

The chicks are deposited in a growout house by manually unloading all of the portable racks outside of each growout house. Each individual containment tray is then removed from the portable rack. In one method, the containment trays are loaded on a flat bed trailer. The flat bed trailer is then pulled through the growout house while laborers deposit the chicks into the growout house by turning the containment trays upside down. In another method, laborers carry the containment trays from the portable racks located outside of the growout house into the growout house, where the chicks are then deposited by turning the containment trays upside down. After all of the containment trays have been unloaded, the vehicle returns the empty containment trays to the hatchery, where the trays are unloaded from the vehicle, cleaned, and reloaded with chicks to stock another growout house.

While the method of delivering chicks set forth above has succeeded in delivering chicks to numerous growout houses, the process is very labor intensive and inefficient. For instance, laborers are needed for loading the containment trays with chicks, loading the containment racks on the delivery vehicle, driving the transportation vehicle between a hatchery and a growout house, unloading containment tray racks from the delivery vehicle at the growout house, removing chicks from the containment trays and placing them within the growout house.

Furthermore, this system is very inefficient. Currently, when a delivery vehicle returns from delivering chicks, anywhere from twenty to forty portable racks must unloaded and replaced with portable racks loaded with chicks. It is far more desirable for the delivery vehicle to arrive at the hatchery, unload its empty containers, load full containers and leave for its next destination within a very short period of time. Essentially, the more time the delivery truck is spent on the road driving, the more money the operation is making.

Thus, a need exists for a system for transporting chicks from a hatchery to a growout house which is more efficient because it uses less labor and is faster than systems currently in use.

SUMMARY OF THE INVENTION

This invention relates to a portable device for transporting fowl, including chicks, ducklings, poults and other young fowl, from a hatchery to a growout house. The portable device is composed of a plurality of vertically stacked conveyor belts, each capable of supporting the fowl. The portable device further includes a plurality of wheels so that it can be moved within a hatchery and loaded onto a delivery vehicle. Additionally, the portable device is sized to fit within a climate controlled compartment attached to a delivery vehicle.

The process for loading the portable device with young fowl is initiated by attaching a loading slide to the portable device and positioning the portable device within a hatchery so that the loading slide is proximate to a hatchery conveyor belt. As the young fowl drop from the hatchery conveyor belt onto the loading slide, they are moved to the conveyor belt on the portable device. Each conveyor belt is loaded with chicks by slowly moving the conveyor belt forward as chicks come off of the loading slide. Once the conveyor belt is fully loaded, a door positioned proximate to the conveyor belt on the portable device is closed, and the loading slide is positioned proximate to another conveyor belt on the portable device for loading. After the loading process is complete, the portable device is placed within a climate-controlled compartment attached to a delivery vehicle. The delivery vehicle then transports the fowl to a growout house.

At the growout house, the fowl are unloaded by first backing the delivery truck into the growout house. An unloading slide is then positioned proximate to a conveyor belt that is to be unloaded. The driver then slowly begins to drive the delivery vehicle forward while nearly simultaneously opening the door proximate the conveyor belt and actuating the conveyor belt to unload the young fowl. The delivery vehicle should proceed at a rate that enables all of the young fowl to be released within the growout house before the delivery vehicle reaches the entrance of the growout house. After all of the young fowl have been released at a single growout house, or within multiple growout houses, the delivery vehicle transports the portable device to a hatchery.

At the hatchery, the portable device can be unloaded and replaced with a portable device previously loaded with young fowl. Thus, the delivery vehicle need only stay at a hatchery's loading dock long enough to unload an empty portable device and load a portable device loaded with young fowl that is ready for delivery. Alternatively, the empty portable device can be loaded with fowl while remaining within the climate-controlled compartment of the delivery vehicle.

The ability to load and unload the portable device from a delivery vehicle provides numerous advantages. Unloading the device from the delivery vehicle allows the device to be thoroughly cleaned after each use, greatly reducing the chances of young fowl developing infections. Further, the delivery vehicle is not required to be at the loading dock while a portable device is being loaded. For instance, a portable device may be loaded within a hatchery while the delivery vehicle is completing a separate delivery. When the delivery vehicle returns to the hatchery with an empty portable device, the empty device is unloaded from the delivery vehicle and a portable device is loaded onto the delivery vehicle. The process of unloading an empty device and loading a full device takes only a few minutes. In contrast, loading the portable device while positioned within a climate-controlled compartment on a delivery vehicle takes considerable more time, thereby decreasing the efficiency of the process.

Another advantage is the ability to release the young fowl without the use of multiple laborers. Traditionally, trays 2 feet wide by 2 feet long have been unloaded from a delivery vehicle and carried by laborers into a growout house. While the traditional method requires numerous laborers to unload a delivery truck, this invention only requires a single person. For instance, an entire portable device can be unloaded by a driver from the cab of the delivery vehicle. Furthermore, a fully loaded portable device can be unloaded faster than the traditional process. Thus, this invention can fill a growout house with young fowl faster and more efficiently than the traditional process.

BRIEF DESCRIPTION OF THE DRAWINGS

The accompanying drawings, which are incorporated in and form a part of the specification, illustrate a preferred embodiment of the present invention and, together within the description, disclose the principles of the invention. In the drawings:

FIG. 7 is a perspective view of the portable device having numerous cut away sections and including an unloading slide;

DETAILED DESCRIPTION OF THE DRAWINGS

Figure 1:
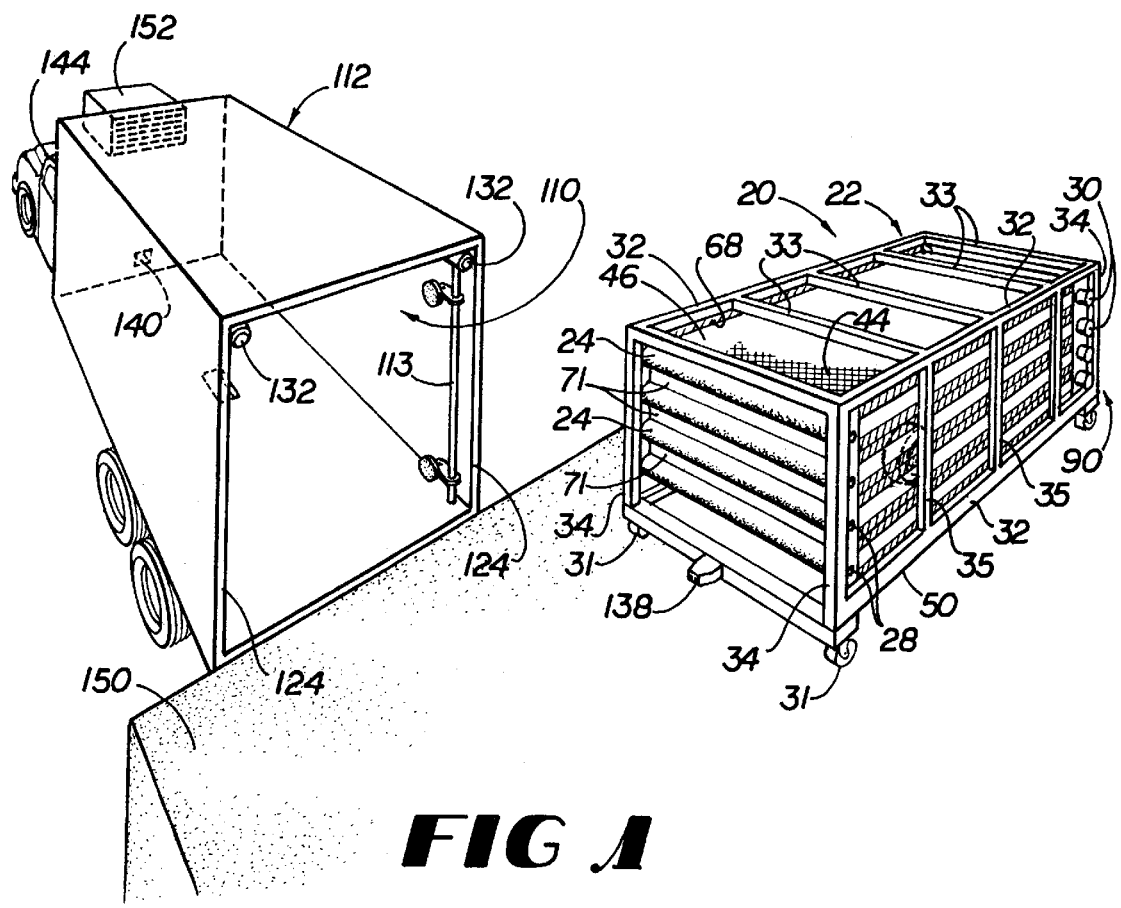
FIG. 1 is a perspective view of the portable device positioned on a loading dock and a delivery vehicle positioned proximate to the loading dock to receive the device.

FIG. 1 illustrates a portable device 20 according to one embodiment of this invention. The portable device 20 is capable of safely transporting young fowl from a hatchery to a growout house where they are raised from hatchlings to a size desired for the marketplace. While this invention is designed to safely transport young poultry, which are commonly referred to as chicks, this invention may also transport other young fowl such as, but not limited to, ducklings or poults. The portable device 20 is sized to fit within a climate-controlled compartment 110 located on a delivery vehicle 112.

In one embodiment, the portable device 20 includes a frame 22 having at least one conveyor belt 24 positioned horizontally within the frame 22. At least one baffle 26 coupled to the at least one conveyor belt 24 or at least door 71 is coupled to the frame 22 to contain the young fowl. A plurality of rollers 28 are coupled to the frame 22 to support each conveyor belt 24 and at least one motor 30 is coupled with the at least one conveyor belt 24. The device 20 further includes a plurality of wheels 31 for supporting the frame 22. Additionally, the portable device 20 includes a loading slide 72 for loading the chicks and an unloading slide 92 for unloading the chicks. Each slide can be attached to the portable device 20 using a variety of quick release connections. A system of limiting switches and alarms are located within the portable device 20 to alert the user while loading or unloading a conveyor belt that the conveyor belt is either full or empty. The limiting switches are used to stop a conveyor belt from running in order to prohibit malfunction of the portable device 20. A camera 132 may also be attached to the delivery vehicle 112 or to the portable device 20 to observe the loading and unloading steps.

During operation, a delivery vehicle 112 having a climate-controlled compartment 110 capable of receiving the portable device 20 transports the device 20 between a hatchery and a growout house. The climate-controlled compartment is preferably within the range from about 18 feet long to about 24 feet long by about 8 feet wide by about 4 feet high. Further, the delivery vehicle 112 should be able to transport between about 5,500 pounds and 8,400 pounds of cargo. Additionally, the delivery vehicle 112 includes a lock-down system 113 for positioning the portable device 20 within the climate-controlled compartment 110 and preventing the portable device 20 from moving during transportation.

1. STRUCTURE

A. Frame

As shown in FIGS. 1 and 7, frame 22 is generally a rectangular solid and includes a cavity 36 adapted to receive at least one conveyor belt 24. Further, frame 22 includes numerous horizontal support elements 32 and vertical support elements 34. Typically, frame 22 includes four horizontal support members 32 that extend the entire length of frame 22. Two of these horizontal support members 32 are located at bottom edges of frame 22 and two of these horizontal support members 32 are located at top edges of frame 22. Frame 22 includes four vertical members 34 positioned in each corner of frame 22. Further, frame 22 may include horizontal cross support members 33 positioned generally orthogonal to the four horizontal support members 32 described above. For instance, frame 22 can include horizontal cross support members 33 on the bottom 50 and top 46 of the frame 22. These horizontal cross support members 33 may be positioned at any angle relative to the four horizontal support members 32. Typically, if the members are composed of at least one metal, the horizontal members 32 and the vertical members 34 are connected using welds. However, the members may be connected using screws, rivets, bolts and nuts, or any other commonly known mechanical fastener. Alternatively, if the members are composed of wood, the members can be held together using nails, screws, angle braces made of wood or metal, or any other suitable fastener.

In one embodiment, frame 22 includes additional vertical support members 35 positioned between vertical support members 34 for providing additional support to frame 22. Members 32–35 may be composed of supports having cross-sections composed of shapes such as, but not limited to, polygonal, circular, elliptical, u-shaped, L-shaped, or any other suitable shape. Further, members 32–35 can have a solid or hollow cross-section. Frame 22 may be composed of materials, including, but not limited to, metals, such as stainless steel, painted steel, galvanized steel, coated steel or aluminum, wood, or any other suitable material.

In one embodiment, frame 22 includes mesh 44 for retaining chicks within frame 22, as shown within FIG. 7. In this embodiment, mesh 44 is on top surface 46 of frame 22. Alternatively, the mesh 44 may be positioned on the sides 48 or a bottom surface 50 of frame 22. The mesh 44 may be composed of expanded metal, chicken wire, or other fencing having openings sized small enough to prevent chicks from escaping the frame 22, or the mesh 44 may be composed of materials such as plastic or wood.

B. Conveyor Belt

Frame 22 includes at least one conveyor belt 24 positioned within cavity 36 formed by the frame 22 and may include any number of conveyor belts 24, such as four or six belts. The design of conveyor belt 24 is the design of conveyor belts commonly found in the market: each conveyor belt 24 is without end, forming a loop. Further, each conveyor belt 24 may be composed of a solid material or a mesh material. Each material can be composed of plastics or metals, such as, but not limited to, stainless steel, galvanized steel, painted steel, or aluminum. In one embodiment, each conveyor belt 24 is approximately 17 feet long by 7.5 feet wide. Additionally, frame 22 may include 6 conveyor belts 24 having a combined height falling within the range from about 3.5 feet to about 4 feet.

Figure 6:
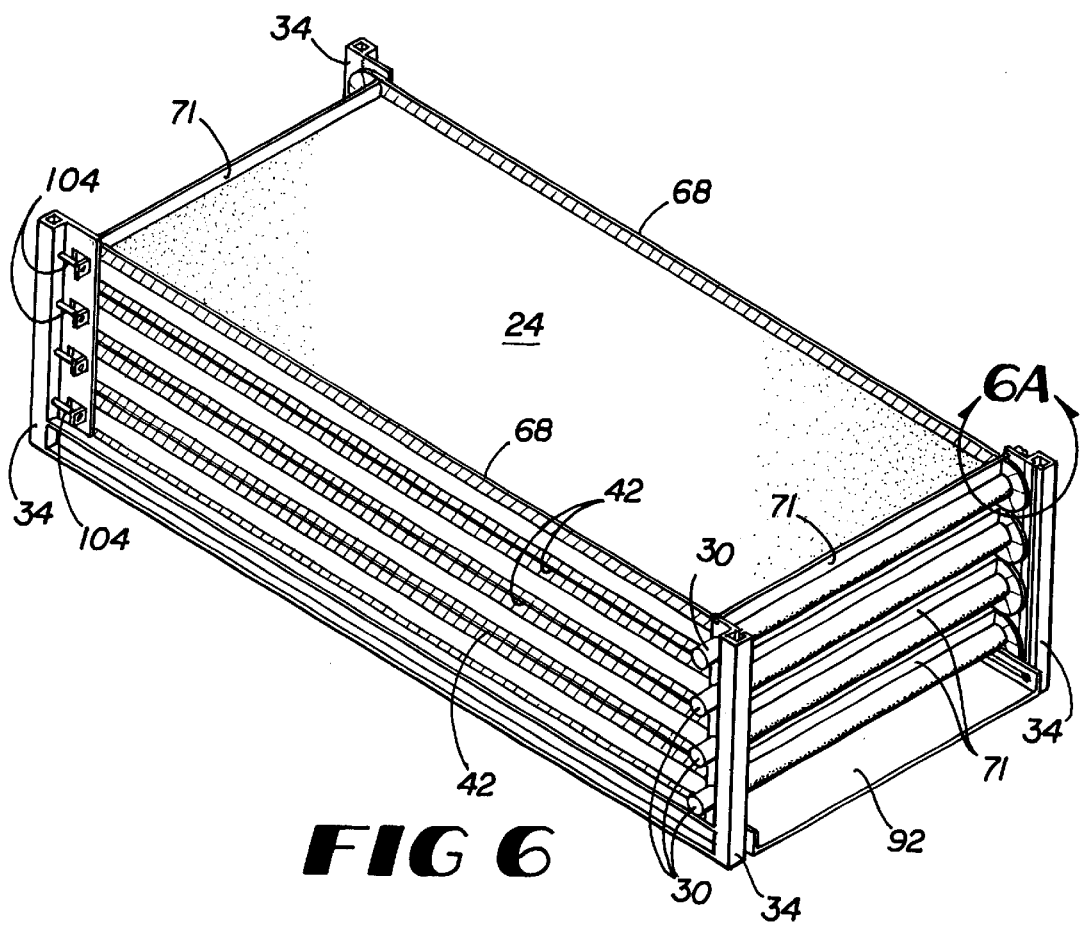
FIG. 6 is a perspective view of a plurality of conveyor belts stacked vertically as though positioned within a portable device.

In one embodiment, conveyor belts 24 are spaced vertically so that the chicks can stand on top surface 40 of a conveyor belt 24 without contacting conveyor belt 24 located above it. Further, conveyor belts 24 should be positioned so that an air space 42 exists between the chicks and conveyor belt 24 located above the chicks, as shown in FIG. 6. Air space 42 allows air to be circulated through frame 22 even when frame 22 is loaded with chicks. Circulating air through frame 22 allows heat generated by the chicks to be dissipated using the influx of fresh air. Further, the influx of fresh air provides the chicks with air having a higher oxygen concentration than the oxygen depleted air previously used by the chicks.

Each conveyor belt 24 is positioned within frame 22 using a roller 28 positioned at each end of the conveyor belt 24. Conveyor belts 24 are sized so that when installed over rollers 28 attached to frame 22, conveyor belts 24 are taut. Further, rollers 28 are attached to vertical support elements 34 so that rollers 28 are capable of rotation. Each conveyor belt 24 includes a top surface 40 and is supported throughout its length so that top surface 40 remains relatively flat in order to provide secure footing for the chicks. Each conveyor belt 24 may be supported throughout its length with rollers or fixed members. Further, each conveyor belt 24 can be tensioned using a belt tensioner.

C. Motor

In one embodiment, a motor 30 is attached to each conveyor belt 24 in order to allow a single conveyor belt 24 to be operated to the exclusion of the other conveyor belts 24. Particularly, a motor 30 is mounted to frame 22 proximate to each conveyor belt 24. Motor 30 can be coupled within conveyor belt 24 using a belt and pulley, a chain and sprocket, a plurality of gears, or any suitable mechanism. Each motor 30 can contain a water tight housing for protection.

The motors 30, 52 that drive conveyor belt 24 and serve other functions and can be composed of a 12 volt motor or a hydraulic motor. The at least one 12 volt motor can be controlled by the control module 60. Preferably, motor 30, 52 can rotate in either of two directions, forward or reverse. This allows for conveyor belts 24 to be moved in either direction. In another embodiment, the at least one 12 volt motor can be substituted with at least one hydraulic motor. The at least one hydraulic motor can be driven by a hydraulic system located on portable device 20 or the at least one motor can be driven by the hydraulic system located within delivery vehicle 112. If the at least one hydraulic motor located on portable device 20 uses the hydraulic system located within delivery vehicle 112, the at least one motor can be connected to the delivery vehicle's hydraulic system using a releasable connection commonly used with hydraulic lines.

Figures 8, 9:
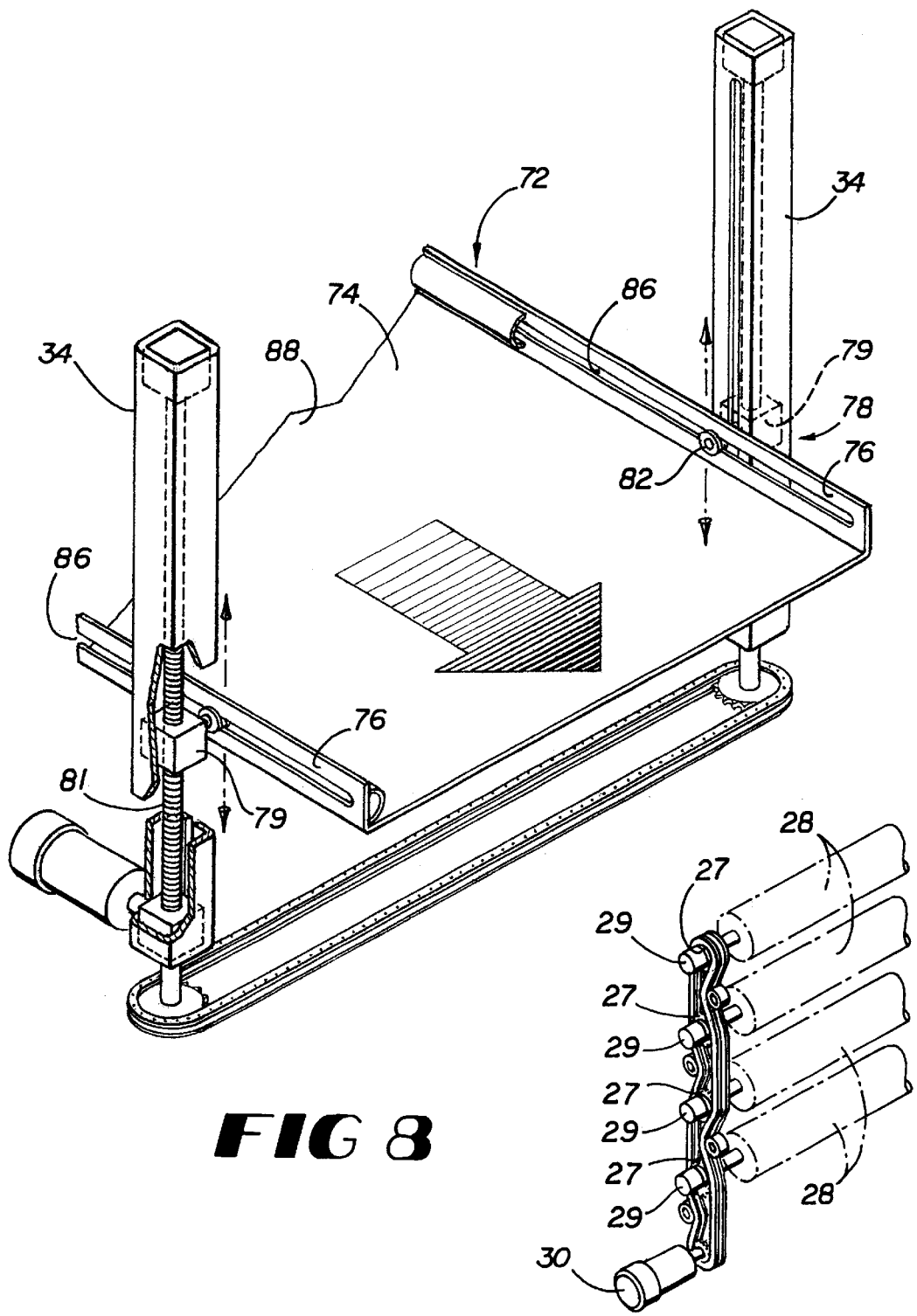
FIG. 8 is a perspective view of a mechanism for positioning either a loading slide or an unloading slide proximate to a conveyor belt.
FIG. 9 is a perspective view of a plurality of conveyor belts driven by a single motor.

In another embodiment, the at least one conveyor belt 24 can be controlled through use of a single motor 30, as shown in FIG. 9. In this embodiment, a single belt or chain is used to connect a plurality of sprockets 27 that are attached to rollers 28 at an end of frame 22 through a plurality of shafts. Alternatively, a pulley can be used in place of sprocket 27 and a belt can be used in place of a chain. In this embodiment, a shaft is attached to each roller 28 and includes a bearing assembly mounted on the shaft. Sprocket 27 is mounted to each bearing assembly. In this position, each bearing assembly allows each roller 28 to remain motionless while the motor 30 is running and rotating sprockets 27. In other words, while motor 30 is turning, none of the rollers 28 rotate until one is engaged with a key. Each key is controlled by a solenoid 29 mounted proximate to sprocket 27 in order to couple roller 28 with the motor 30. Each solenoid 29 includes a piston attached to a key. When solenoid 29 is activated, the key attached to it is inserted through a hole in sprocket 27 and into an end of roller 28, thereby coupling roller 28 to motor 30. As a result, when motor 30 begins operating, roller 28 receiving the key and conveyor belt 24 coupled with roller 28 rotate while the remaining conveyor belts 24 remain stationary. Otherwise, if no key were inserted into a keyway, sprockets 27 would spin free and no roller or conveyor belt would turn.

Figure 4:
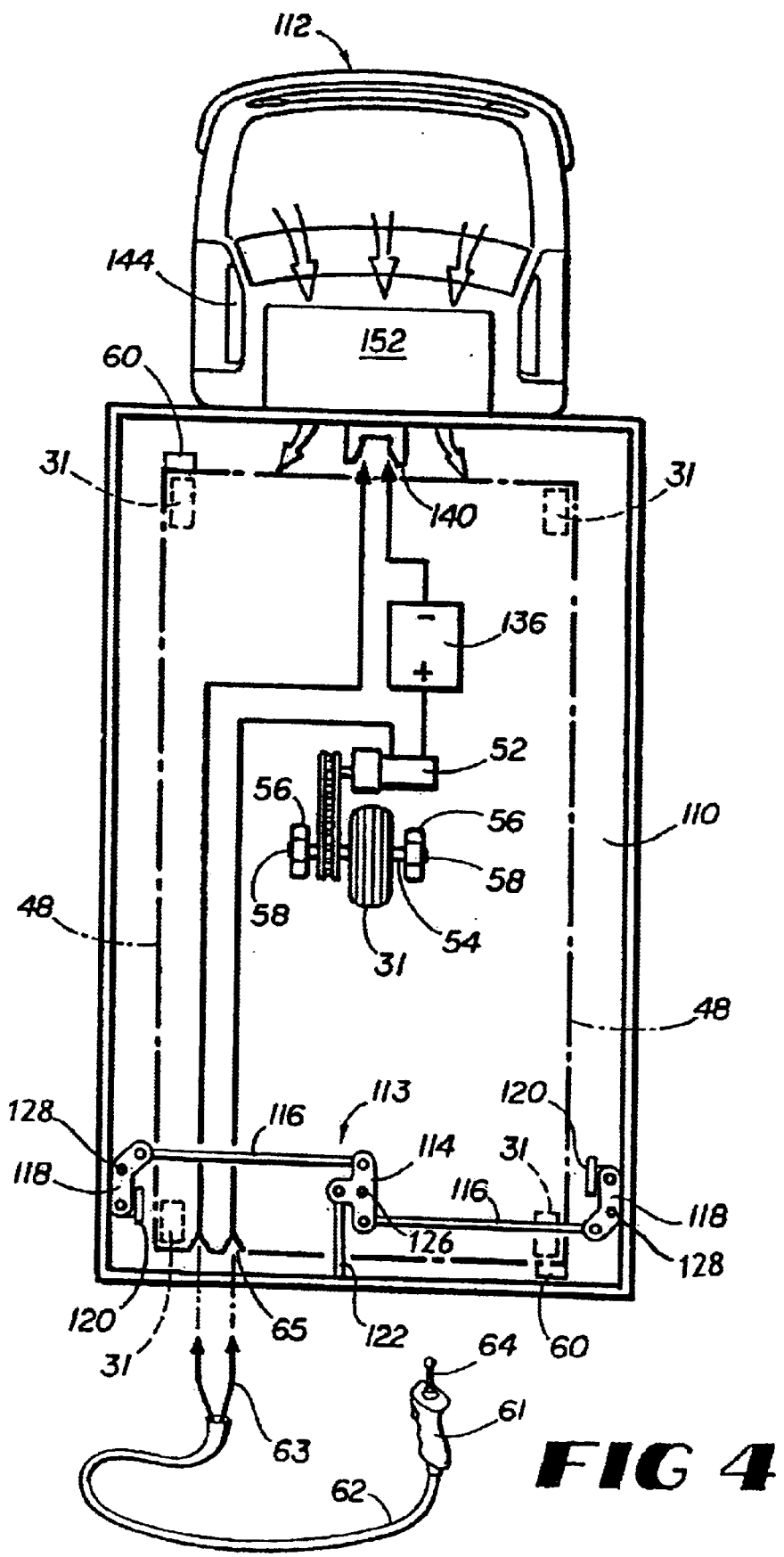
FIG. 4 is a top plan view of the delivery vehicle including a schematic of the electrical wiring system and a lock down system in an open position.

These solenoids are controlled using control module 60, as shown in FIG. 4, that controls various aspects of the portable device 20. Specifically, control module 60 allows a user to individually turn on and off each motor 30 that drives each conveyor belt 24. Further, control module 60 enables a user to control the speed of conveyor belts 24. Additional aspects controlled by the control module 60 are set forth below.

D. Battery

Figure 5:
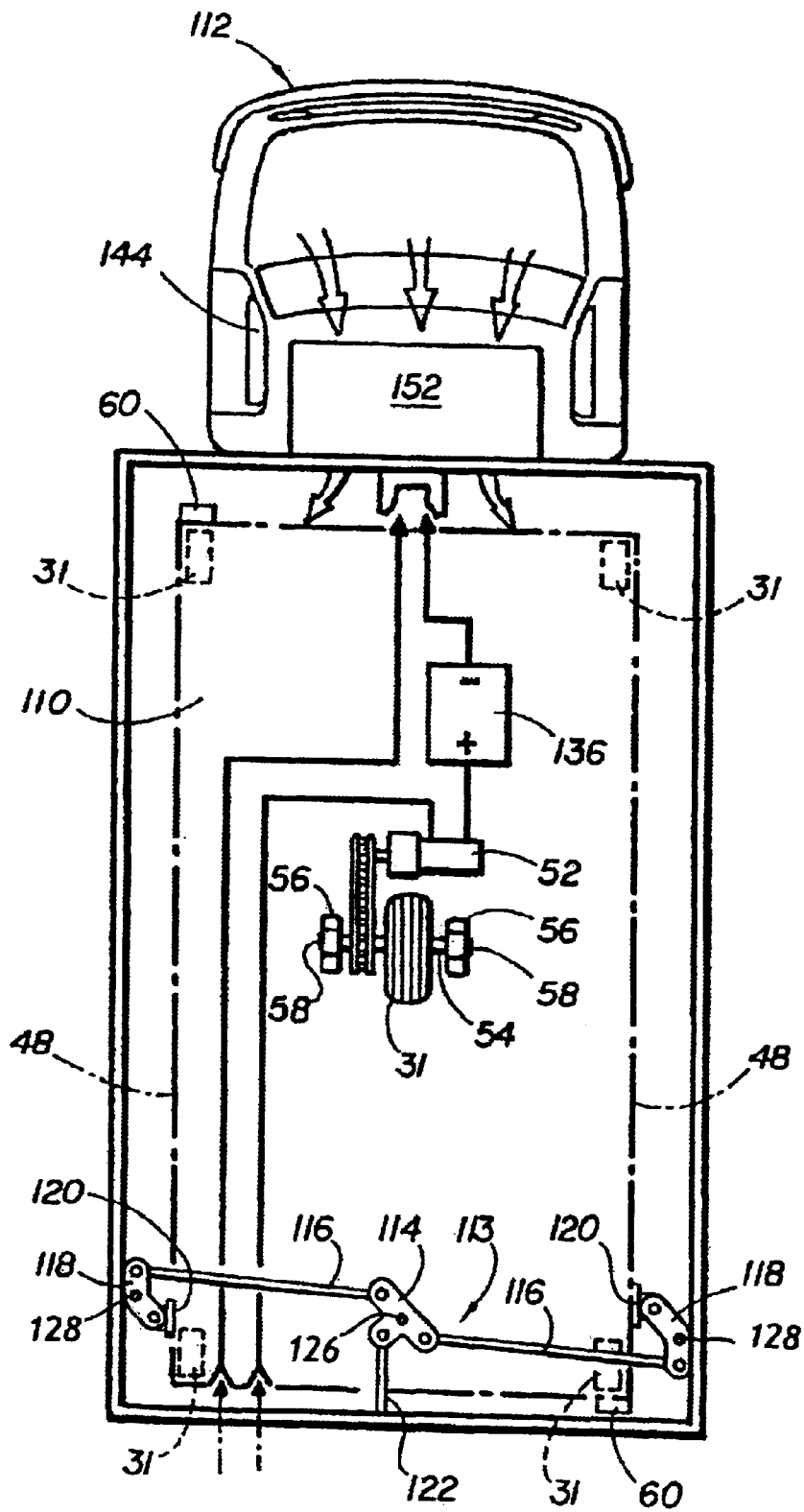
FIG. 5 is a top plan view of the delivery vehicle including a schematic of the electrical wiring system and a lock down system in a closed position.

The portable device 20 can further include at least one battery 136, as shown schematically in FIGS. 4 and 5. Battery 136 can be a 12 volt battery capable of powering the motors used to drive the plurality of wheels 31 and the conveyor belts 24, and to actuate the solenoids. In another embodiment, battery 136 can be of a voltage other than 12 volts, as dictated by the requirements of the motors and solenoids. Battery 136 can be mount to frame 22 in nearly any location; however, battery 136 is preferably positioned near the bottom of the portable device 20 so that it can be easily accessed for maintenance or replacement.

Additionally, portable device 20 can be powered using power provided by a commercial power company, a generator, or another external power source. In order to use this power, a voltage converter should be used to convert the voltage provided by a commercial power company to 12 volts for use by the motors positioned on portable device 20. Alternatively, the voltage converter can convert the voltage to a voltage other than 12 volts, as dictated by the requirements of the motors and solenoids. The voltage converter can also convert alternating current to direct current. The voltage converter should be connected within the electrical system of the portable device 20 between each motor 30, 52 and an electrical receptacle. The electrical receptacle is preferably a male plug that is capable of receiving a standard female plug connected to an electrical extension cord. Alternatively, the electrical receptacle could be a female plug.

E. Electrical Connection

In one embodiment, portable device 20 is capable of being coupled to the electrical system of the delivery vehicle while it is being moved into climate-climate controlled compartment 110, as shown in FIG. 1. Portable device 20 can include a first fitting 138 for connecting with a second fitting 140 positioned within the climate-controlled compartment 110. Preferably, second fitting 140 of climate-controlled compartment 110 is a female fitting capable of receiving first fitting 138, which is a male fitting. The male fitting can further include a tapered head in order to facilitate connection. This connection allows the unloading process to be controlled from cab 144 of delivery vehicle 112. Particularly, the connection enables one to operate the at least one motor 30 attached to the at least one conveyor belt 24 and the solenoids attached to doors 71. Further, the connection allows the at least one battery 136 to be electrically coupled to the electrical system of delivery vehicle 112. As a result, the alternator connected to the engine of delivery vehicle 112 charges the at least one battery 136 whenever the engine of delivery vehicle 112 is running. Thus, the engine of delivery vehicle 112 works to keep the at least one battery 136 in a charged state.

It is preferably that second fitting 140 be a female fitting so that portable device 20 can be moved into climate-controlled compartment 110 and connected to the delivery vehicle's electrical system without significant additional effort. However, in another embodiment, first fitting 138 can be a female fitting and second fitting 140 can be a male fitting.

In one embodiment, first fitting 138 can be attached to the end of frame 22 opposite unloading end 90, as shown in FIG. 1. First fitting 138 should be positioned so that as portable device 20 is being placed within climate-controlled compartment 110, first fitting 138 is simultaneously being inserted within second fitting 140 mounted to climate-controlled compartment 110. Thus, once portable device 20 has been completely positioned within climate-controlled compartment 110, first fitting 138 is completely coupled to second fitting 140.

In an alternative embodiment, first fitting 138 need not be positioned proximate to the end of frame 22 opposite unloading end 90. Instead, first fitting 138 can be positioned on frame 22 proximate unloading end 90. In this embodiment, second fitting 140 is connected to an electrical cord. Electrical cord can be permanently or releasably attached to the electrical system of delivery vehicle 112. In this embodiment, first and second fittings 138, 140 are not connected together by the action for moving portable device 20 within climate-controlled compartment 110, as set forth in the previous embodiment. Rather, first and second fittings 138, 140 are connected together by a separate action. Preferably, first and second fittings 138, 140 are connected together after portable device 20 has been placed within climate-controlled compartment 110. However, first and second fittings 138, 140 can be connected before placing portable device 20 within climate-controlled compartment 110.

F. Control Module

The control module 60 may be attached to frame 22 at a position where it can be accessed for removal of the portable device 20 when device 20 is located within a climate-controlled compartment 110 on a delivery vehicle 112. Alternatively, control module 60 may be mounted to the frame 22 in a location that is inaccessible when portable device 20 is positioned within climate-controlled compartment 110. In this embodiment, a second control module 61 is coupled to motors 30 using a cord 62. Preferably, cord 62 is of sufficient length so that motor 52 can be operated by someone standing out of the path of travel of the portable device 20. Alternatively, this embodiment need not also have a control module 60 attached to the frame 22.

The control module 61 can be disconnected from the device 20 using a receptacle system, or other suitable reusable electrical connection system. Specifically, the second control module 61 includes cord 62 attached to a first fitting 63, such as a plug or receptacle. The first fitting 63 is capable of being coupled to a second fitting 65, which is composed of the receptacle or plug capable of being coupled with the first fitting 63 on the end of the cord 62.

In one embodiment, control module 60 includes a joystick 64, which allows a user to move the portable device 20 in various directions by moving joystick 64 in the desired direction relative to control module 60. Joystick 64 also controls the speed of device 20. The further joystick 64 is moved in one direction relative to control module 60, the faster motors 52 turn in the direction dictated by control module 60. In an alternative embodiment, control module 60 includes a switch controlling each motor 52. For instance, the switch may be a three-way toggle switch that can be moved forward or backward. In this embodiment, the direction of movement of the portable device 20 is controlled with the toggle switches.

The at least one motor 52 set forth above is controlled using control module 60 described in detail above. Control module 60 enables a user to control many aspects of motor 52. In the embodiment set forth above, where frame 22 includes a center drive wheel 31, control module 60 enables portable device 20 to be moved forward, backward, or in any other direction on the ground. In an alternative embodiment, control module 60 includes either a toggle switch or a rheostat for controlling motor 52.

G. Wheels

The portable device 20 is capable of being moved using the plurality of wheels 31. Preferably, at least four wheels 31 are attached to frame 22 at each bottom corner; however, alternative embodiments may include more than or less than four wheels 31. Each wheel 31 may be a caster wheel, a rim coupled with an inflated tire, a solid plastic tire, a rubber tire, a polyurethane tire, or other suitable tire. Additionally, the wheels 31 can be non-marking and oil-resistant.

In one embodiment, frame 22 includes at least four wheels 31 with at least one wheel 31 mounted to frame 22 at each bottom corner of frame 22. Preferably, two wheels 31 are rotatably connected to frame 22 in order to allow steering of the device 20. Wheels 31 may be controlled using a rack and pinion system connected to a steering wheel as commonly used in automobiles. However, it is not necessary to include a mechanism for steering the portable device 20. At least one wheel 31 may be powered by a motor 52, which may be coupled to the at least one wheel 31 directly, with gears, a chain, a belt, or a drive shaft attached to a differential, whereby the differential transfers the rotational power from the drive shaft to the at least one wheel 31.

In another embodiment, frame 22 includes at least five wheels 31 coupled to the portable device 20, whereby at least one wheel 31 is attached to the device in each of the four bottom corners and at least one wheel is attached to the center of frame 22, as shown in FIGS. 4 and 5. At least two of these wheels 31 are rotatably connected to frame 22 in order to control the direction of movement of the portable device 20.

In another embodiment, all of the wheels 31 mounted at the corners are capable of being rotated. The wheel 31 in the center of frame 22 is coupled to frame 22 using a shaft 54 attached to at least two support brackets 56, whereby at least one support bracket 56 is positioned on each side of the wheel 31. In one embodiment, center wheel 31 can be rotatably attached to shaft 54 using a bearing assembly 58. Further, a motor 52 may be attached to center wheel 31 to drive center wheel 31, as set forth in the embodiment above.

In either of the embodiments set forth above, wheels 31 located in two adjacent corners can be driven by separate motors 52. Motors 52 are individually controlled enabling device 20 to be steered using only the motors 52. For instance, device 20 can be turned to the right by moving the left rear wheel forward while keeping the right rear wheel stationary. This right turn is made tighter by moving the right rear wheel backward. This motion, and others, is controlled using the control module 60.

H. Baffle

In one embodiment, each conveyor belt 24 includes at least one baffle 26, as shown in FIGS. 10–13. Each baffle 26 is positioned generally orthogonal to the longitudinal axis of frame 22 and of the conveyor belt 24. Baffle 26 contains young fowl within top surface 40 of conveyor belt 24. Baffle 26 should extend the width of the conveyor belt 24 and have a height adequate to prohibit chicks from escaping over baffle 26. In one embodiment, baffle 26 preferably has a height of about 1 and ¾ inches to about 5 inches. More preferably, the height is about 2½ inches. In this embodiment, a single baffle 26 is attached to each conveyor belt 24, and belt 24 is installed within frame 22 so that when the portable transportation apparatus 20 is not loaded with chicks, baffle 26 is positioned on the top surface 40 of conveyor belt 24 nearest the end of frame 22 upon which the chicks are loaded, referred to as loading end 66.

In another embodiment, each conveyor belt 24 includes more than one baffle 26. In this embodiment, two or more baffles 26 are located on at least one conveyor belt 24 for confining the chicks to a top surface 46 of at least one conveyor belt 24. Preferably, at least two baffles 26 are attached on each end of conveyor belt 24 and preferably orthogonal to the longitudinal axis of conveyor belt 24.

The baffle 26, may be composed of solid materials, such as a mat, or mesh materials having holes sized no larger than about ½ inch to prevent young fowl from passing through it or getting caught in it. Thus, the mesh material can be composed of any of the materials set forth above as alternatives for the mesh 44. Further, the solid or mesh materials may be composed of, but are not limited to, metals, such as aluminum, steel, stainless steel, galvanized steel, painted steel, coated steel, wood, plastics, or any combinations thereof. Baffle 26 can be attached to conveyor belt 24 using any of an adhesive, mechanical connections such as rivets, staples, or slip joints, or thermal bonding. Baffle 26 may be one such as those manufactured by Ashworth Bros., Inc. of Winchester, Va. or Intralox Inc., USA of Harahan, La.

I. Side Walls

Side walls 68 are also used to retain chicks on top surface 40 of each conveyor belt 24. In one embodiment, side walls 68 are mounted to conveyor belts 24, as shown in FIGS. 6, 7, and 10–13. In this embodiment, side walls 68 are composed of a plurality of interleaved elements which prevent the chicks from leaving top surface 40 of conveyor belt 24. More particularly, the elements overlap each other and are connected to top surface 40 of a conveyor belt 24 and not to each other. This enables conveyor belt 24 to rotate around a roller 28, located at one end of the frame 22. A side wall 68 fitting this description is produced by Ashworth Bros., Inc. of Winchester, Va.

In another embodiment, side walls 68 are mounted to frame 22 on each side of conveyor belt 24 so that bottom edges of side walls 68 are mounted near the level of the top surface 40 of conveyor belt 24. In this manner, young fowl cannot escape between the bottom edge and top surface 40 of conveyor belt 24. Thus, the distance between the bottom edge of side walls 68 and top surface 40 of each conveyor belt 24 should not be more than about ¾ of an inch for chicks. Alternatively, the bottom edge of a side wall 68 can be mounted beneath top surface 40 of conveyor belt 24, thereby eliminating any gap between bottom edge of side walls 68 and top surface 40 of each conveyor belt 24.

J. Doors

The portable device 20 further includes a plurality of doors 71 positioned at the loading end 66 of frame 22, as shown in FIGS. 6 and 10–13. Each door 71 is mounted proximate to loading end 66 of each conveyor belt 24. Each door 71 has a width approximately equal to the width of the opening in frame 22 between two vertical support elements 22 at loading end 66 and a height no greater than the vertical distance between each conveyor belt 24. Further, the height of the door 71 should not be less than about 2 inches for chicks in order to prevent them from escaping. Particularly, door 71 should not be sized so that a young fowl could escape over the top of door 71. The thickness of door 71 is negligible and is preferably between about ¹⁄₁₆ inch and about ⅛ inch. Doors 71 may be composed of materials including metals, such as aluminum, stainless steel, galvanized steel, coated steel or painted steel, wood, plastic, or other suitable materials.

Figure 10:
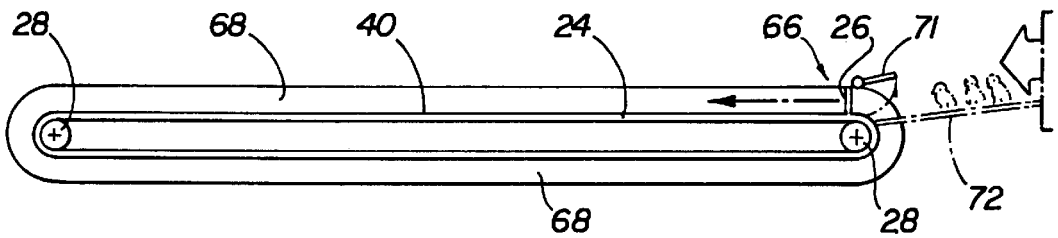
FIGS. 10–13 are side views of a conveyor belt during the loading and unloading processes.
Figure 11:
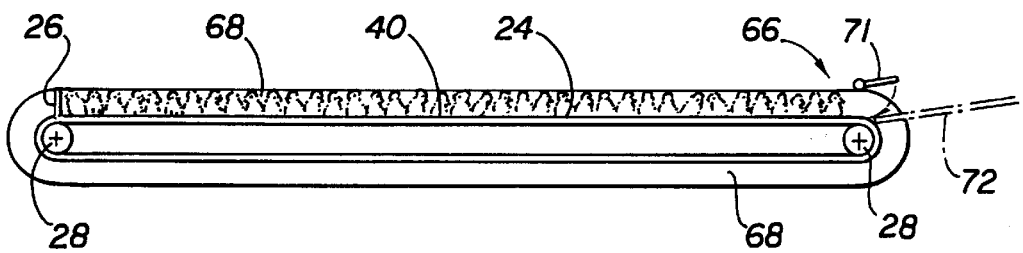

In one embodiment, door 71 is rotatably attached to frame 22 so that door 71 can be used to prevent young fowl from leaving top surface 46 of conveyor belt 24 and can be opened by rotating it out of this position in order to unload the young fowl from conveyor belt 24. Each door 71 may be rotatably attached to frame 22 using any commonly known hinge assembly. Further, each door 71 can be coupled to frame 22 proximate to top surface 46 of each conveyor belt 24, and each door 71 is opened by rotating it downward in order to allow chicks to be loaded or unloaded. Alternatively, each door 71 can be coupled to the frame 22 between about 2½ inches and about 5 inches above the top surface 46 of conveyor belt 24, and each door 71 is opened by rotating it upward, as shown in FIGS. 10 and 11, in order to allow chicks to be loaded or unloaded from conveyor belt 24.

Figure 6A:
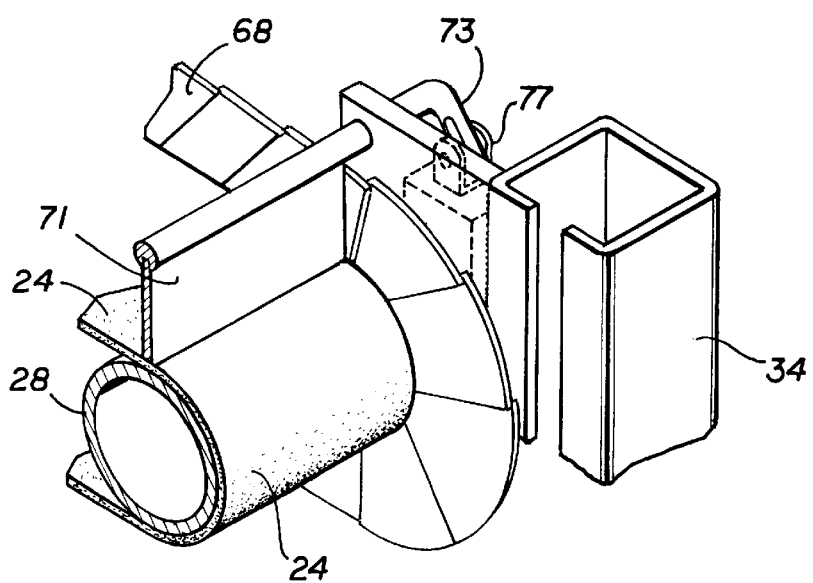
FIG. 6A is a detailed view of a conveyor belt and a mechanism for opening a containment door that is taken at 6A in FIG. 6.

The door 71 is rotated using handle 73 attached to the door 71, as shown in FIG. 6A. The handle 73 can be controlled using a solenoid 77, which is controlled by the control module 60. Further, the control module 60 may include a switch for each door 71 so that each door 71 can be opened individually.

In an alternative embodiment, frame 22 includes a plurality of doors 71 positioned at each end of frame 22 proximate to each end of each conveyor belt 24. In this embodiment, each conveyor belt 24 would not need a baffle 26 attached to each conveyor belt 24. Instead, the doors 71 prevent young fowl from walking off of the conveyor belt 24.

K. Loading Slide

The young fowl are loaded onto the portable device 20 using a loading slide 72, as shown in FIG. 8. In one embodiment, loading slide 72 includes flat panel 74 having a plurality of sides 76 and an attachment mechanism 78. The attachment mechanism 78 of the loading slide 72 can be composed of a plurality of journals 79 and drive screws or worm gears 81 to move unloading slide 92 proximate to a desired conveyor belt 24. Particularly, the journals 79 are sized to travel along the drive screws 81 when the drive screws 81 are rotated. Thus, rotating the drive screws 81 in one direction raises unloading slide 92 and reversing the rotation lowers unloading slide 92. Once a conveyor belt 24 is fully loaded with young fowl, the loading slide 72 can be positioned proximate to an empty conveyor belt 24 by moving the belt or chain. This embodiment can also be used with a cable and pulley.

In another embodiment, the attachment mechanism 78 can be composed of at least two hooks mounted on each side of one end of the loading slide 72. The hooks are sized to couple with posts 82 that are mounted to the vertical support members 34. The posts 82 are mounted to the vertical support members 34 proximate each conveyor belt 24. The loading slide 72 is attached to the attachment mechanism 78 by securing each hook around the posts 82. The loading slide 72 is preferably composed of a lightweight material such as plastic. However, the loading slide 72 can be composed of materials including, but not limited to, wood or metals, such as aluminum, stainless steel, galvanized steel, painted steel or coated steel.

In yet another embodiment, the attachment mechanism 78 can be composed of arms attached to the loading slide 72 that are received by slots located on or within the vertical support members 34. The arms extend from the loading slide 72 a distance sufficient to support the load developed by the loading slide 72. The slots are arranged so that when the arms are positioned within the slots, the loading end 88 of the loading slide 72 is located above the unloading end 90 of the loading slide 72. In this position, the young fowl are gravity feed onto each conveyor belt 24.

L. Unloading Slide

Figure 15:
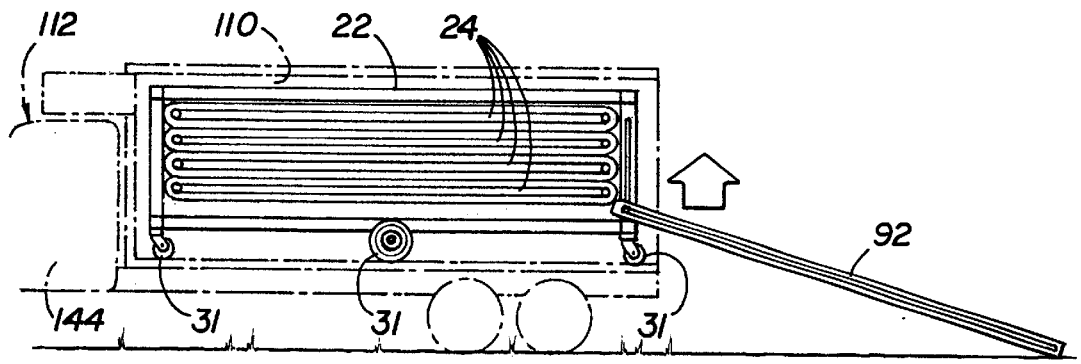
Figure 16:
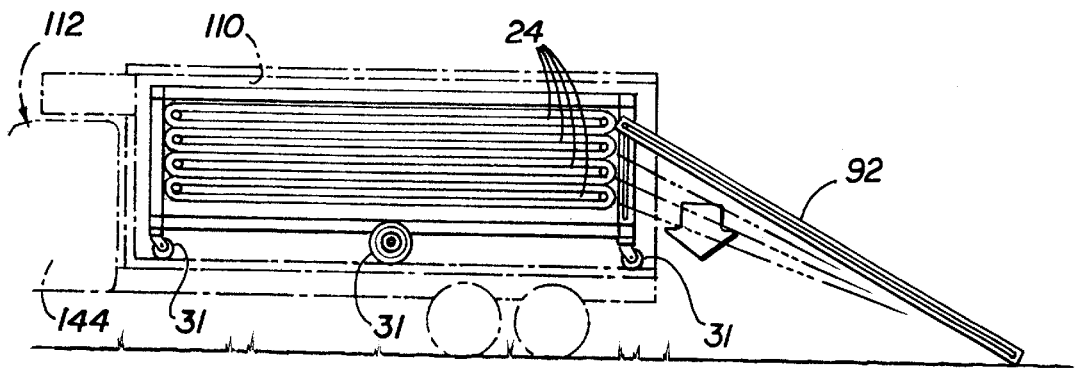

Using an apparatus similar to the loading slide 72, the young fowl are unloaded using an unloading slide 92, as shown in FIGS. 7, 15, and 16. The unloading slide 92 is composed of a slide surface 94 and sides 96. Preferably, the unloading slide 92 has a width approximately equivalent to the width of the at least one conveyor belt 24 at the unloading end 90. In one embodiment, the unloading slide 92 is composed of two main sections which enable it to be stored at the unloading end 90 of the frame 22, near the bottom surface 50 the frame 22, or on the top surface 46. The sections can be connected with at least one hinge positioned along the entire width of the unloading slide 92. Alternatively, the unloading slide 92 can be connected using other connections that allow rotation. In another alternative embodiment the unloading slide 92 can be composed of a single section or three or more sections.

In another embodiment, the two main sections of the unloading slide 92 are capable of being stored within each other, as shown in FIG. 7. More particularly, a first section 95 is slideably connected to a second section 97 so that the first section 95 can be stored by sliding it onto the second section 92. The second section 97 contains sides having slots positioned parallel to the longitudinal axis of the unloading slide 92. Posts or bolts from the first section 95 are inserted into the slots in order to act as a guide for the first section 95.

The unloading slide 92 can further include a directional guide 98 mounted to the slide surface 94. Directional guide 98 acts to guide young fowl during the unloading process towards the watering and feeding stations positioned within the growout house. Feeding and watering the young fowl immediately after being transported from a hatchery greatly increase their chance of survival and the probability of growing at a fast rate. Traditionally, a growout house has two rows of feeders and waterers, one row located near each side of the house. Thus, directional guide 98 releases the chicks toward the feeders and waters in order to increase their chance of survival and decrease their chance of sickness, disease and possible death. However, directional guide 98 should be used in a freespan growout house and not in a post style house. Using directional guide 98 in a post-style house could cause young fowl to be thrown into a post and be injured. A post style house is a term commonly used in the art for a house constructed of trusses that are supported across the span of the trusses using posts as support braces that are positioned between a floor of the house and the trusses.

Directional guide 98 is positioned within the center to slide surface 94 along the longitudinal axis of unloading slide 92. Directional guide 98 begins at then end of the slide surface 94 nearest the conveyor belt and travels to the bottom of unloading slide 92. In this position, directional guide 98 provides the chicks with a smooth transition so that the chicks would not suffer injuries if they were to hit directional guide 98. Directional guide 98 can be composed of plastics, wood, or metals, such as aluminum, stainless steel, coated steel, galvanized steel or painted steel. Further, directional guide 98 can be attached to slide surface 94 using thermal bonding, adhesives, or mechanical connections, such as, but not limited to, snaps, clips, interference fits, screws, or rivets.

In one embodiment, unloading slide 92 is attached to frame 22 through attachment mechanism 78, as shown in FIG. 8, used to attach the loading slide 72 to frame 22. In this embodiment, loading end 66 and unloading end 90 of conveyor belts 24 become the came end, as shown in FIGS.

10–13. Thus, unloading slide 92 is attached to the journals in order to position unloading slide 92 proximate to a desired conveyor belt 24. Additionally, a cable can be used to raise and lower unloading slide 92. In either of these embodiments, a motor may be connected to the pulley or sprocket to facilitate positioning of unloading slide 92.

In an alternative embodiment, the unloading slide 92 can be connected to the end of the device 20 opposite the loading end 66. Furthermore, a mechanism other than that shown in FIG. 8 could be used to attached the unloading slide 92 to the frame 22.

As mentioned above, unloading slide 92 may be stored underneath, or on top of the portable device 20, or on the end of frame 22. Frame 22 can include a storage compartment 99 attached to bottom surface 50 of frame 22 for receiving unloading slide 92 or loading slide 72, or both. Alternatively, frame 22 can include a storage rack or compartment 99 on top surface 46 of frame 22 for receiving unloading slide 92 or loading slide 72, or both. Still yet, unloading slide 92 or loading slide 72, or both, can be stored on an end of frame 22. Unloading slide 92 can be stored by folding the unloading slide 92 about the connection between its two main sections. Unloading slide 92 can be held in place using a retaining bar, rope, or other such retention device.

M. Intelligence Systems

1. Limiting Switch

Portable device 20 includes a system of alarms and limiting switches to prevent a conveyor belt 24 from being overloaded. In one embodiment, at least one conveyor belt 24 includes at least one limiting switch 104 positioned anywhere along frame 22 proximate a conveyor belt 24 and positioned so that as baffle 26 attached to conveyor belt 24 nears the end of frame 22 opposite loading end 66, a member attached to conveyor belt 24 causes the motor 30 attached to conveyor belt 22 contacts limiting switch 104. Contacting limiting switch 104 opens an electrical circuit connected to motor 30 controlling conveyor belt 24. Therefore, the limiting switch prohibits baffle 26 from being run over the end of conveyor belt 24 causing the young fowl located on top surface 46 of conveyor belt 24 to be dumped off of portable device 20.

In an alternative embodiment, limiting switch 104 can be located near the end of frame 22 opposite loading end 66. Limiting switch 104 is positioned so that just prior to baffle 26 being rolled around roller 28 at the end of frame 22, baffle 26 contacts limiting switch 104. As a result, motor 30 cannot operate and conveyor belt 24 is stopped.

2. Alarm

In addition to the limiting switch described above, portable device 20 may include a system of alarms to alert a laborer that baffle 26 is nearing the end of the conveyor belt 24, as shown in FIG. 7. Particularly, an alarm device 108 can be mounted to frame 22 so that just prior to completely loading a conveyor belt 24 with young fowl, alarm device 108 is triggered by a member contacting a limiting switch 104. Alternatively, alarm device 108 may be triggered by baffle 26 contacting a limiting switch. As set forth above, it is not necessary to position the limiting switch near the end of frame 22 opposite loading end 66 of conveyor belt 24. Instead, limiting switch 104 may be positioned anywhere proximate conveyor belt 24 such that a member contacts it as baffle 26 nears the end. The alarm device 108 may be composed of an audible alarm, such as a speaker or a buzzer, or a visual alarm, such as a LED, or both, or other suitable device. In one embodiment, alarm device 108 is activated before conveyor belt 24 is fully loaded. In another embodiment, alarm device 108 is activated when the power directed to motor 52 is cut off using a limiting switch 104.

N. Delivery Vehicle

1. Climate-Controlled Compartment

Portable device 20 is sized to fit within a climate-controlled compartment 110 of a delivery vehicle 112. Delivery vehicle 112 is composed of cab 144, climate-controlled compartment 110, an electrical system and all other parts typically found within a delivery vehicle. Delivery vehicle 112 is capable of receiving a maximum load sufficiently larger than the approximate maximum weight of portable device 20 completely loaded with young fowl, which can be within the range of about 5,500 pounds to about 8,400 pounds. The height of delivery vehicle 112 should be lower than the height of the entrance into a growout house, which is typically about seven feet. Climate-controlled compartment 110 can be located anywhere on delivery vehicle 112; however, it is preferable to locate it behind cab 144. The height of the floor of climate-controlled compartment 110 relative to the ground should be approximately equal to the height of a loading dock 150 at a hatchery in order to facilitate easy loading and unloading of portable device 20. Otherwise, loading ramps can be used to provide a transition between the floor of delivery vehicle 112 and the deck of the loading dock at a hatchery. The air temperature within climate-controlled compartment 110 can be controlled using an air conditioning unit or a heating unit, or both. Further, a single unit 152, as shown in FIGS. 1 and 3–5, having both an air conditioning element and a heating element can be also be used.

2. Lock-Down System

As set forth above, portable device 20 is sized to fit within climate-controlled compartment 110 attached to delivery vehicle 112. Preferably, either delivery vehicle 112 or climate-controlled compartment 110 contain a means for restraining portable device 20 when it is positioned within climate-controlled compartment 110, as shown in FIGS. 1, 4 and 5. In one embodiment, lock-down system 113 is mounted to the interior portion of climate-controlled compartment 110. Specifically, lock-down system 113 can be composed of a bell crank 114, a plurality of crank rods 116 attached to the bell crank 114, a brake crank arm 118 attached to an end of each crank rod 116, at least one brake pad. 120 attached to each brake crank arm 118, and a bell crank rod 122 attached to the bell crank 114 for actuating the lock-down system 113. Preferably, lock-down system 113 is mounted proximate to sides 124 of climate-controlled compartment 110.

Lock-down system 113 is operated by pulling bell crank rod 122 away from frame 22, thereby rotating bell crank 114 around pivot 126. This rotation forces crank rods 116 toward the sides of climate-controlled compartment 110. In turn, brake crank arms 118 are rotated about brake pivots 128 so that brake pads 120 contact side 48 of portable device 20. Portable device 20 is held in place as a result of being contacted by brake pads 120. Further, brake pads 120 contact portable device 20 in a manner that allows for even air flow around and though conveyor belts 24.

In another embodiment, lock-down system 113 can be composed of a plurality of wheel stops capable of being placed beneath wheels 31 of portable device 20. In another embodiment, lock-down system 113 can be composed of at least one tie down hook mounted frame 22 and at least one tie-down hook mounted to climate-controlled compartment 110. In this embodiment, portable device 20 can be secured by connecting these tie-down hooks using a chain, a strap, a rope, or other suitable fastener.

O. Camera

Figure 2:
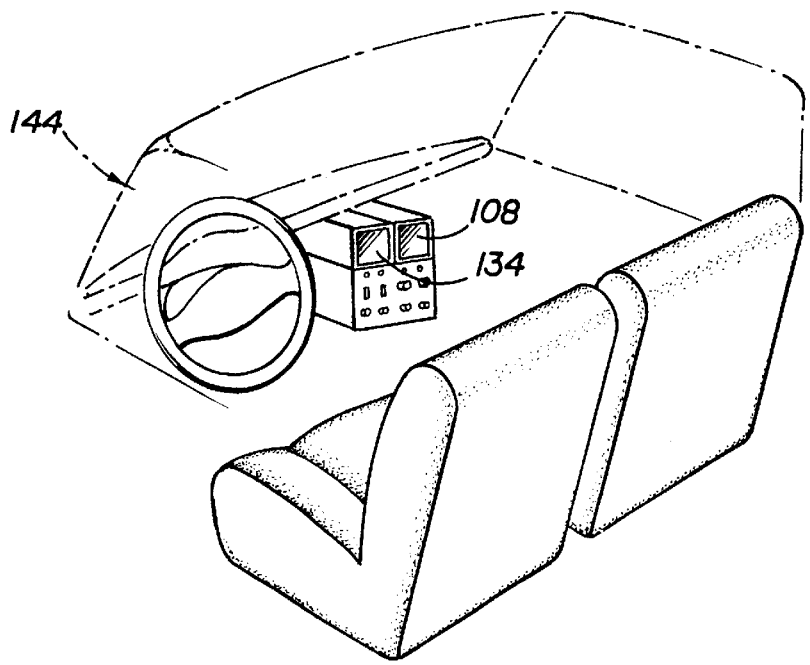
FIG. 2 is a perspective view of a cab of the delivery vehicle.

At least one camera 132, as shown in FIG. 1, can be used to monitor the loading or unloading processes, or both. The at least one camera 132 can be connected to a display screen 134 mounted within cab 144 of delivery vehicle 112, thereby enabling the loading and unloading process to be viewed from cab 144, as shown in FIG. 2. The at least one camera 132 can be mounted to frame 22 of the portable device 20 or the at least one camera 132 can be mounted to the climate-controlled compartment 110. The at least one camera 132 should be mounted so that the entire unloading process can be viewed. Particularly, it is desirable that the at least one camera 132 be positioned so that the transition of the chicks from a conveyor belt 24 to unloading slide 92 can be viewed and that the transition of the chicks from unloading slide 92 to a floor can be viewed. Camera 132 can be any camera commonly available within the video projection industry or surveillance industry. Camera 132 can be waterproof or water resistant, or neither. The at least one camera 132 can also include a motor capable of rotating camera 132 to different positions so that various locations may be viewed using a single camera 132. The direction of the at least one camera 132 can be controlled using the control module 60.

II. LOADING PROCEDURE

The loading procedure preferably begins by loading young fowl at a hatchery onto a portable device 20. Traditionally, young fowl are loaded into containment trays as they drop from a conveyor belt after passing through a counting device, as shown in FIG. 10. The portable device 20 is designed to interact with the systems currently in place within the hatcheries. The loading process is initiated by locating the portable device 20 proximate to an end of a conveyor belt delivering young fowl from at least one incubator in a hatchery, as shown in FIG. 10. The loading slide 72 is installed by attaching it to the frame 22 using the attachment mechanism 78. Door 71 located proximate to the desired conveyor belt 24 is opened to allow chicks to enter conveyor belt 24. The portable device 20 is then positioned so that loading end 88 of loading slide 72 is located under the end of the conveyor belt coming from the incubators so that as a young fowl falls from the conveyor belt in the hatchery, it lands softly on loading slide 72. From there, each young fowl slides, rolls, or tumbles down loading slide 72 and onto conveyor belt 24. During the loading process, control module 60 or 61 is used to control each conveyor belt 24.

Figure 12:
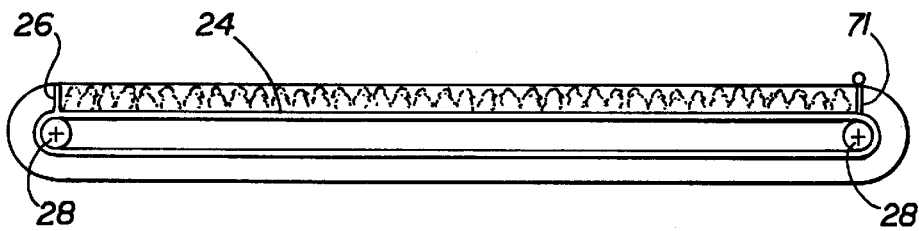
Figure 13:
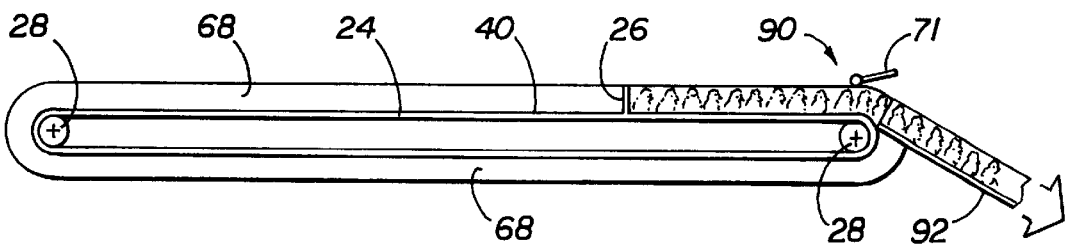

Initially, baffle 26 is positioned at loading end 66 of frame 22. During the loading process, baffle 26 is moved away from this end of frame 22 towards the loading end 66 of frame 22 along top surface 46 of conveyor belt 24 in order to make room for the chicks coming from loading slide 72, as shown in FIG. 11. However, baffle 26 is not moved forward in great amounts at any one point in time during the loading process. Instead, baffle 26 is jogged forward in small amounts in order to load conveyor belt 24 to its full capacity. The loading process can be stopped at any time by stopping conveyor belt 24 and closing door 71, as shown in FIG. 12. Alternatively, the conveyor belt can be completely filled if desired. Once conveyor belt 24 has almost been completely loaded with young fowl, the laborer can be alerted by alarm device 108 that conveyor belt 24 is almost completely loaded. As conveyor belt 24 becomes completely loaded with young fowl, a limiting switch 104 is triggered, either by baffle 26 or a member, causing motor 30 driving conveyor belt 24 to stop. Loading slide 72 is then repositioned in front of another conveyor belt 24 and the process set forth above is repeated.

When the desired number of young fowl have been placed within portable device 20, the loading process is ended. The young fowl can be stored temporarily in the portable device 20 or can be loaded immediately onto delivery vehicle 112. Preferably, the hatchery has a loading dock 150 which can be used to load the portable device 20 on delivery vehicle 112. It is preferable that delivery vehicle 112 include climate-controlled compartment 110 capable of receiving the portable device 20. If the portable device 20 is powered by motors, then it can be driven into climate-controlled compartment 110. Otherwise, the portable device 20 must be pushed into climate-controlled compartment 110 using a forklift, pallet jack, laborers, or other means. If the portable device 20 is equipped with fitting 140 for connecting to delivery vehicle 112, the connection should be made during the loading process. After the portable device 20 has been rolled into position in climate-controlled compartment 110, it must be restrained from being able to move during transportation using one of the methods set forth above.

III. UNLOADING PROCEDURE

Figure 3:
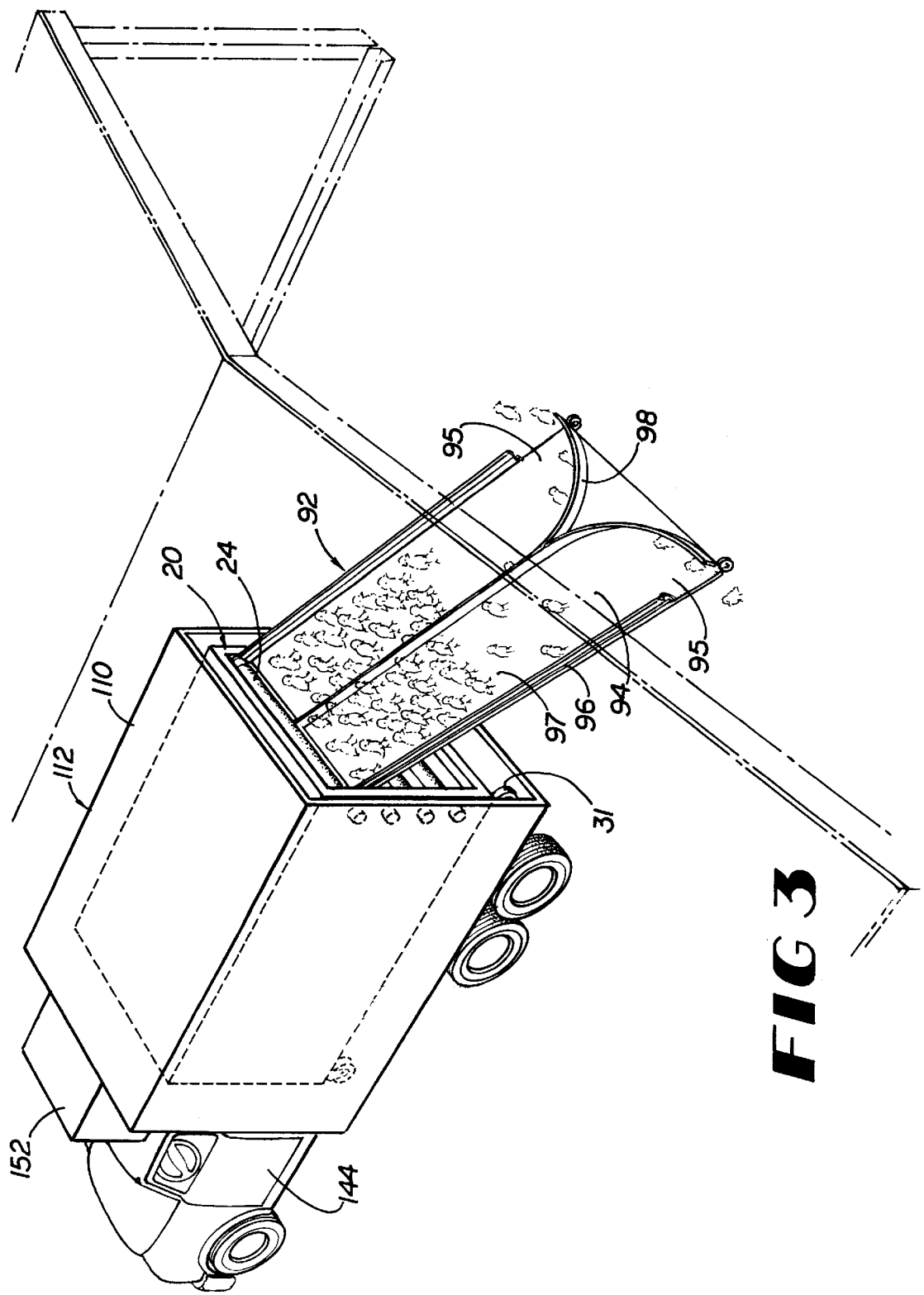
FIG. 3 is a perspective view of the portable device located within a growout house during the unloading process.

Upon arrival at a growout house, delivery vehicle 112 is prepared for the unloading process. First, the doors at the end of the growout house are opened. Preferably, the entrance of the growout house is sized to receive delivery vehicle 112. If so, delivery vehicle 112 is backed into the growout house to the end of the containment area for the young fowl, which, if the house is a standard 40 foot wide by 500 foot long house, is located about 200 feet from the entrance doors, as shown in FIG. 3. Otherwise, the unloading process is completed at the entrance to the growout house.

Figure 14:
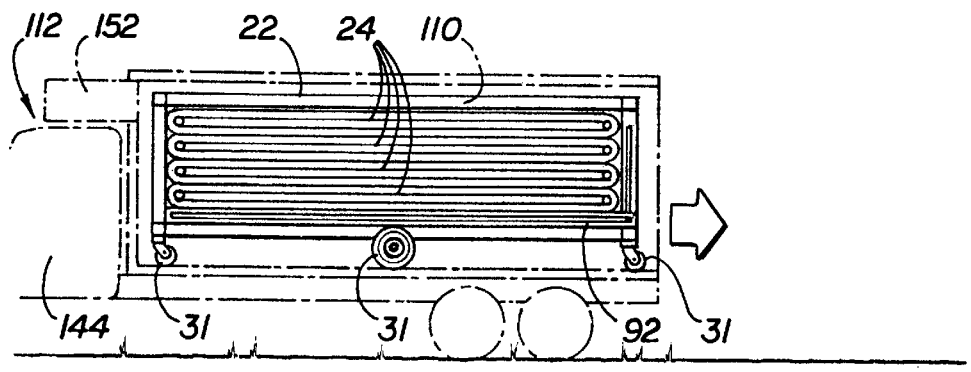
FIGS. 14–16 are side views of the portable device showing the steps of positioning the unloading slide proximate to a desired conveyor belt.

After delivery vehicle 112 has been positioned, unloading slide 92 is retrieved from its storage compartment 99 and attached to unloading end 90 of the portable device 20, while device 20 remains within climate-controlled storage compartment 110, as shown in FIGS. 14–16. Unloading slide 92 is then positioned proximate to a desired conveyor belt 24 for unloading. If the portable device 20 includes a single attachment mechanism for locating unloading slide 94, unloading slide 94 is positioned proximate to a conveyor belt using control module 60 or 61. A directional guide 98 is attached to unloading slide 92 if the growout house is not a post style house. If the growout house is a post style house, then directional guide 98 is not attached to unloading slide 94.

The unloading process begins by opening the door 71 located proximate to conveyor belt 24 desired to be unloaded and activating a motor 30 connected to desired conveyor belt 24. Activating conveyor belt 24 transports the young fowl from conveyor belt 24 to unloading slide 92. At the same time that conveyor belt 24 begins to unload the young fowl, delivery vehicle 112 moves slowly forward so that the young fowl are not all unloaded at the same location. Preferably, delivery truck 112 moves at a slow speed so that after the desired amount of young fowl has been unloaded within the growout house, delivery truck 112 has progressed from its location at the beginning of the unloading process to the entrance doors of the growout house.

If it is desired that young fowl from more than one conveyor belt be unloaded, each conveyor belt 24 must be unloaded one at a time. Preferably, the unloading operation can be controlled from within cab 144 of delivery vehicle 112. The driver of delivery vehicle 112 is alerted that conveyor belt 24 has been completely unloaded through an alarm device 108, such as an audible alarm produced by a buzzer or a speaker, or a visual alarm such as a LED. Further, it is preferable that as baffle 26 on conveyor belt 24 reaches unloading end 90 of frame 22, a limiting switch 104 is triggered that stops motor 30 driving conveyor belt 24. This places conveyor belt 24 and baffle 26 in the correct position for loading when the device 20 is returned to the hatchery.

When conveyor belt 24 has been completely unloaded, control module 60 is used to position unloading slide 92 proximate to another conveyor belt 24 that is desired to be unloaded. Once in position, the conveyor belt 24 is unloaded using the procedure set forth above. All or any part of a conveyor belt 24 may be unloaded in a single growout house. Thus, the portable device 20 can accommodate transporting young fowl of various species to different growout houses by separating them using the at least one conveyor belt 24. For instance, young fowl destined for one house can be placed on one or more conveyor belts 24 and young fowl destined for another house can be placed on other conveyor belts 24. After all of the.young fowl desired to be delivered have been unloaded, unloading slide 92 is returned to storage compartment 99 and the unloading process is completed.

After delivery vehicle 112 has delivered the young fowl to at least a single growout house, delivery vehicle 112 may return to a hatchery. At the hatchery, delivery truck 112 can be loaded with young fowl in at least two ways. First, empty portable device 20 in climate-controlled compartment 110 of delivery vehicle 112 can be removed and replaced with another portable device 20 that is loaded with young fowl, thereby resulting in a tremendous savings of time. Second, empty portable device 20 in climate-controlled compartment 110 of delivery vehicle 112 can be reloaded with chicks while portable device 20 remains within delivery vehicle 112.

While various embodiments of this invention have been described above, these descriptions are given for purposes of illustration and explanation. Variations, changes, modifications and departures from the systems and methods disclosed above may be adopted without departure from the spirit and scope of this invention.

I claim:

1. A portable device for transporting fowl, comprising:
   a frame having a longitudinal axis, wherein the frame is adapted for placement in a vehicle for transporting the apparatus to a growout house;
   at least one conveyor belt coupled to the frame and positioned generally horizontal relative to the frame, wherein the at least one conveyor belt has a top surface capable of supporting fowl;
   at least one baffle coupled to the at least one conveyor belt;
   at least one side wall;
   a plurality of rollers coupled to the frame and positioned at each end of the conveyor belt transverse to the longitudinal axis of the frame for supporting the at least one conveyor belt; and
   a plurality of wheels attached to the frame;
   wherein the plurality of wheels facilitate placement of the portable device into the delivery vehicle and removal from the delivery vehicle for transporting young fowl.

2. The portable device of claim 1, wherein the at least one baffle is positioned generally orthogonal to the longitudinal axis of the frame.

3. The portable device of claim 1, further comprising a motor for rotating the plurality of the wheels.

4. The portable device of claim 1, further comprising a means for rotating the plurality of the wheels.

5. The portable device of claim 4, wherein the means for rotating the plurality of the wheels is at least one electric motor.

6. The portable device of claim 4, wherein the means for rotating the plurality of the wheels is at least one hydraulic motor.

7. The portable device of claim 1, wherein the at least one side wall is coupled to the at least one conveyor belt for containing the fowl on the top surface of the at least one conveyor belt.

8. The portable device of claim 1, wherein the at least one side wall is coupled to the frame for containing the fowl on the top surface of the at least one conveyor belt.

9. The portable device of claim 1, further comprising a control module.

10. The portable device of claim 9, wherein the control module is adapted to communicate with portions of the portable device using wireless communications.

11. The portable device of claim 9, wherein the control module is mounted on the frame.

12. The portable device of claim 9, wherein the control module is mounted within a cab of a delivery vehicle.

13. The portable device of claim 9, further comprising a receptacle for receiving a fitting in electrical communication with the control module.

14. The portable device of claim 1, further comprising a fitting that connects the portable device to a vehicle.

15. The portable device of claim 1, further comprising a loading slide for directing the fowl onto the at least one conveyor belt, comprising:
   a panel; and
   a plurality of sides coupled to the panel;
   wherein the loading slide is adapted for attachment to the frame.

16. The portable device of claim 1, further comprising an unloading slide.

17. The portable device of claim 16, wherein the unloading slide further comprises a slide having a directional guide positioned along a longitudinal axis of the slide for directing fowl toward watering devices located within a growout house.

18. The portable device of claim 15, further comprising a storage system for storing the loading slide.

19. The portable device of claim 15, further comprising a means for storing the loading slide.

20. The portable device of claim 19, wherein the means for storing the loading slide comprises a storage compartment positioned on a back surface of the frame.

21. The portable device of claim 19, wherein the means for storing the loading slide comprises a storage compartment positioned on a bottom surface of the frame.

22. The portable device of claim 19, wherein the means for storing the loading slide comprises a storage compartment positioned on a top surface of the frame.

23. The portable device of claim 16, further comprising an attachment mechanism for attaching the unloading slide to the portable device.

24. The portable device of claim 16, further comprising a means for positioning the unloading slide proximate a conveyor belt.

25. The portable device of claim 24, wherein the means for positioning the unloading slide proximate to a conveyor belt comprises a chain and sprocket.

26. The portable device of claim 24, wherein the means for positioning the unloading slide proximate to a conveyor belt comprising a cable and pulley.

27. The portable device of claim 24, wherein the means for positioning the unloading slide proximate a conveyor belt comprises at least one drive screw and at least one journal.

28. The portable device of claim 1, wherein the conveyor belt further comprises at least two baffles positioned generally orthogonal to the longitudinal axis of the conveyor belt and affixed to the conveyor belt so that when a first baffle is located above a first end roller, a second baffle is positioned above the second end roller located at an end of the frame opposite the first roller.

29. The portable device of claim 1, further comprising at least one door coupled to the frame proximate to a roller and positioned generally orthogonal to the longitudinal axis of the frame, wherein the at least one door is capable of containing the fowl on the top surface of one of the at least one conveyor belt.

30. The portable device of claim 29, further comprising a solenoid coupled to the at least one door so that in a first position the solenoid maintains the at least one door in a generally closed position and in a second position the solenoid maintains the at least one door in a generally open position for allowing the fowl to be loaded or unloaded.

31. The portable device of claim 1, further comprising a motor for driving the at least one conveyor belt.

32. The portable device of claim 1, further comprising a means for driving the at least one conveyor belt along a path established by the plurality of rollers.

33. The portable device of claim 32, wherein the means for driving the at least one conveyor belt comprises at least one hydraulic motor.

34. The portable device of claim 32, wherein the means for driving the at least one conveyor belt comprises at least one electric motor.

35. The portable device of claim 32, wherein the means for driving the at least one conveyor belt comprises a plurality of motors.

36. The portable device of claim 32, wherein the means for driving the at least one conveyor belt comprises a single motor in communication with the at least one conveyor belt.

37. The portable device of claim 36, further comprising:
a shaft attached to each roller;
a bearing assembly attached to each shaft;
a sprocket attached to each bearing assembly and comprising an aperture for receiving a key;
a solenoid coupled to each sprocket;
a key coupled to each solenoid; and
a chain attached to each sprocket.

38. The portable device of claim 1, further comprising at least one camera for monitoring the loading process or the unloading process.

39. The portable device of claim 1, further comprising at least one battery positioned within the portable device for supplying power.

40. The portable device of claim 1, further comprising a voltage converter for converting power supplied by an external power source.

41. An apparatus for transporting fowl, comprising:
a vehicle capable of passing through an entrance to a growout house, comprising:
a cab;
a climate-controlled storage compartment coupled to the vehicle rearward of the cab and adapted to a portable device;
the portable device, comprising:
a frame having a longitudinal axis, wherein.the frame is adapted for placement in the vehicle for transporting the apparatus to a growout house;
at least one conveyor belt coupled to the frame and positioned generally horizontal relative to the frame, wherein the at least one conveyor belt has a top surface capable of supporting fowl;
at least one baffle coupled to the at least one conveyor belt;
at least one side wall;
a plurality of rollers coupled to the frame and positioned at each end of the conveyor belt transverse to the longitudinal axis of the frame for supporting the at least one conveyor belt; and
a plurality of wheels attached to the frame;
wherein the plurality of wheels facilitate placement of the portable device into the delivery vehicle and removal from the delivery vehicle for transporting young fowl.

42. The apparatus of claim 41, further comprising a first fitting coupled to the storage compartment for receiving a second fitting coupled to the portable device.

43. The apparatus of claim 41, further comprising a control module mounted within the cab of the vehicle for controlling the portable device.

44. The apparatus of claim 41, further comprising a lock-down system for restraining the portable device within the storage compartment.

45. The apparatus of claim 41, further comprising a means for restraining the portable device within the storage compartment.

46. The apparatus of claim 45, wherein the means for restraining the portable device within the climate-controlled storage compartment comprises:
at least one bell crank coupled to the climate-controlled storage compartment;
at least one crank rod coupled to the at least one bell crank;
at least one bell crank rod coupled to the at least one bell crank;
at least one pivot brake crank arm coupled to the at least one crank rod; and
at least one brake pad coupled to the at least one pivot brake crank arm for contacting the portable device.

47. The apparatus of claim 41, further comprising at least one camera for monitoring the loading process or the unloading process.

48. A method for transporting fowl, comprising:
loading fowl from a hatchery into a portable device for transporting fowl from the hatchery to a growout house, wherein the portable device comprises:
a frame having a longitudinal axis, wherein the frame is adapted for placement in a vehicle for transporting the apparatus to a growout house;
at least one conveyor belt coupled to the frame and positioned generally horizontal relative to the frame, wherein the at least one conveyor belt has a top surface capable of supporting fowl;
at least one baffle coupled to the at least one conveyor belt;
at least one side wall;
a plurality of rollers coupled to the frame and positioned at each end of the conveyor belt transverse to the longitudinal axis of the frame for supporting the at least one conveyor belt; and
a plurality of wheels attached to the frame;
wherein the plurality of wheels facilitate placement of the portable device into the delivery vehicle and removal from the delivery vehicle for transporting young fowl;
loading the portable device onto a vehicle;

transporting the fowl from the hatchery to the growout house; and releasing the fowl within the growout house.

49. The method of claim 48, further comprising backing the delivery vehicle into the growout house prior to releasing the fowl.

50. The method of claim 48, wherein loading the fowl from the hatchery into the device further comprises placing a loading slide beneath a hatchery conveyor belt.

51. The method of claim 48, wherein loading the device onto a vehicle further comprises coupling the device with an electrical system of the vehicle.

52. The method of claim 48, wherein loading the device onto a vehicle further comprises coupling the device with the hydraulic system of the vehicle.

53. The method of claim 48, further comprises securing the device to the vehicle.

54. The method of claim 48, wherein releasing the fowl further comprises positioning an unloading slide proximate to a conveyor belt, actuating the conveyor belt, and moving the vehicle while the conveyor belt is actuated.

55. A method of storing fowl within a hatchery, comprising:

loading fowl from the hatchery into a portable device, the portable device comprising:
  a frame having a longitudinal axis, wherein the frame is adapted for placement in a vehicle for transporting the apparatus to a growout house;
  at least one conveyor belt coupled to the frame and positioned generally horizontal relative to the frame, wherein the at least one conveyor belt has a top surface capable of supporting fowl;
  at least one baffle coupled to the at least one conveyor belt;
  at least one side wall;
  a plurality of rollers coupled to the frame and positioned at each end of the conveyor belt transverse to the longitudinal axis of the frame for supporting the at least one conveyor belt; and
  a plurality of wheels attached to the frame;
  wherein the plurality of wheels facilitate placement of the portable device into the delivery vehicle and removal from the delivery vehicle for transporting young fowl; and storing the portable device.

56. A portable device for transporting fowl, comprising:

a frame having a longitudinal axis, wherein the frame is adapted for placement in a vehicle for transporting the apparatus to a growout house;

at least one conveyor belt coupled to the frame and positioned generally horizontal relative to the frame, wherein the at least one conveyor belt has a top surface capable of supporting fowl;

at least one baffle coupled to the at least one conveyor belt;

at least one side wall;

a plurality of rollers coupled to the frame and positioned at each end of the conveyor belt transverse to the longitudinal axis of the frame for supporting the at least one conveyor belt;

a plurality of wheels attached to the frame;

wherein the plurality of wheels facilitate placement of the portable device into the delivery vehicle and removal from the delivery vehicle for transporting young fowl;

at least one motor coupled to the at least one conveyor belt for driving the at least one conveyor belt along a path established by the plurality of rollers;

at least one motor coupled to at least one wheel for rotating the wheel;

at least one door coupled to the frame proximate to each conveyor belt, wherein the door is coupled with a solenoid capable of opening and closing the door;

a control module for controlling operation of the at least one door, the at least one motor coupled to the at least one wheel, and the at least one motor coupled to that at least one conveyor belt;

a battery system;

a fitting for connecting to an external power source; and a voltage converter for converting power supplied by an external power source.

57. An portable device for transporting fowl, comprising:

a frame having a longitudinal axis, wherein the frame is adapted for placement in a vehicle for transporting the apparatus to a growout house;

at least one conveyor belt coupled to the frame and positioned generally horizontal relative to the frame, wherein the at least one conveyor belt has a top surface capable of supporting fowl;

at least one door coupled to each end of the frame proximate to each conveyor belt and positioned generally orthogonal to the longitudinal axis of the frame for containing fowl on the top surface of each conveyor belt;

at least one side wall;

a plurality of rollers coupled to the frame and positioned at each end of the conveyor belt transverse to the longitudinal axis of the frame for supporting the at least one conveyor belt; and a plurality of wheels attached to the frame;

wherein the plurality of wheels facilitate placement of the portable device into the delivery vehicle and removal from the delivery vehicle for transporting young fowl.

* * * * *